US012575013B2

(12) United States Patent
Loyer

(10) Patent No.: US 12,575,013 B2
(45) Date of Patent: Mar. 10, 2026

(54) VARIABLE INPUT DEVICE UTILIZING TIME-OF-FLIGHT OF AN OPTICAL TRANSMISSION THROUGH A DISCONTINUOUS OPTICAL GUIDE

(71) Applicant: STMicroelectronics International N.V., Geneva (CH)

(72) Inventor: Dominique Loyer, Saint Ismier (FR)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 40 days.

(21) Appl. No.: 18/670,175

(22) Filed: May 21, 2024

(65) Prior Publication Data

US 2025/0365839 A1 Nov. 27, 2025

(51) Int. Cl.
| | |
|---|---|
| *H05B 47/195* | (2020.01) |
| *G01S 7/481* | (2006.01) |
| *G01S 7/4865* | (2020.01) |
| *H05B 47/115* | (2020.01) |
| *H05B 47/14* | (2020.01) |

(52) U.S. Cl.
CPC .......... *H05B 47/195* (2020.01); *G01S 7/4814* (2013.01); *G01S 7/4865* (2013.01); *H05B 47/115* (2020.01); *H05B 47/14* (2020.01)

(58) Field of Classification Search
CPC .... H05B 47/195; H05B 47/115; H05B 47/14; G01S 7/4814; G01S 7/4865
See application file for complete search history.

(56) References Cited

U.S. PATENT DOCUMENTS

| | | |
|---|---|---|
| 11,416,074 B1 | 8/2022 | Trincia |
| 2017/0351336 A1 | 12/2017 | Yang et al. |
| 2018/0059245 A1 | 3/2018 | Meinherz et al. |
| 2018/0335305 A1 | 11/2018 | Seitz et al. |
| 2019/0324143 A1* | 10/2019 | Gimpel .................. G01S 17/42 |
| 2020/0301011 A1* | 9/2020 | Niinami ............... G01S 7/4915 |
| 2021/0031628 A1 | 2/2021 | Herrmann |
| 2022/0120899 A1 | 4/2022 | Yan et al. |
| 2022/0229188 A1 | 7/2022 | Klug et al. |

OTHER PUBLICATIONS

Extended European Search Report for European Application No. 25174687.1, dated Oct. 27, 2025, 9 pages.

* cited by examiner

*Primary Examiner* — Daniel D Chang
(74) *Attorney, Agent, or Firm* — Alston & Bird LLP

(57) ABSTRACT

A variable input device, a dimmable light system, and a computer-implemented method for determining a variable input, are provided. An example variable input device includes an optical guide, an illumination source, an optical receiver, and a controller. The optical guide contains reflective structures positioned within the optical guide, each a unique distance from a first end. The illumination source is positioned to direct emitted light toward each reflective structure. Each reflective structure directs a portion of the emitted light out of the interface surface of the optical guide. The optical receiver receives a portion of the emitted light reflected by a reflective target proximate the interface surface. The controller is configured to determine a lateral position of the reflective target based on a time-of-flight of the returned portion of the emitted light, and generate a variable input within an operating range for an operating.

20 Claims, 6 Drawing Sheets

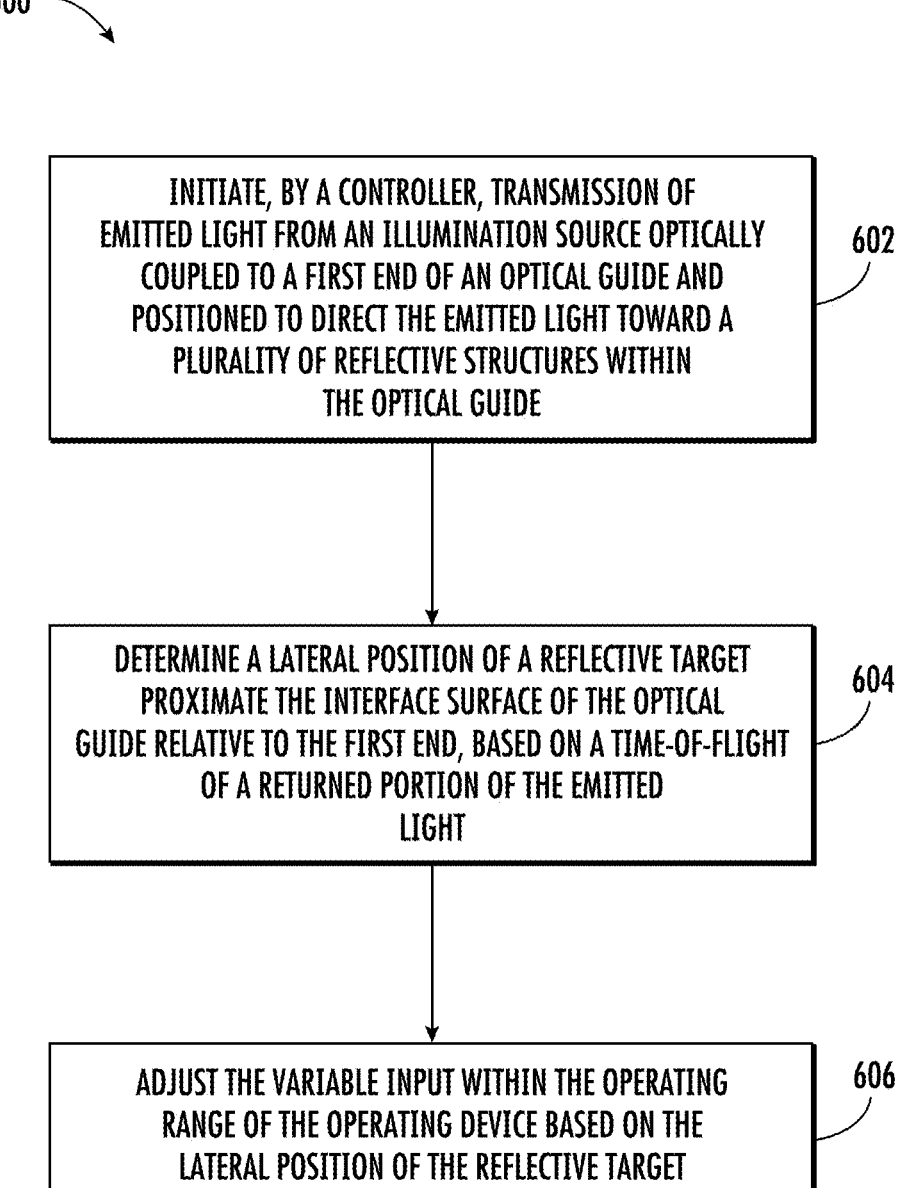

600

INITIATE, BY A CONTROLLER, TRANSMISSION OF
EMITTED LIGHT FROM AN ILLUMINATION SOURCE OPTICALLY
COUPLED TO A FIRST END OF AN OPTICAL GUIDE AND
POSITIONED TO DIRECT THE EMITTED LIGHT TOWARD A
PLURALITY OF REFLECTIVE STRUCTURES WITHIN
THE OPTICAL GUIDE

602

DETERMINE A LATERAL POSITION OF A REFLECTIVE TARGET
PROXIMATE THE INTERFACE SURFACE OF THE OPTICAL
GUIDE RELATIVE TO THE FIRST END, BASED ON A TIME-OF-FLIGHT
OF A RETURNED PORTION OF THE EMITTED
LIGHT

604

ADJUST THE VARIABLE INPUT WITHIN THE OPERATING
RANGE OF THE OPERATING DEVICE BASED ON THE
LATERAL POSITION OF THE REFLECTIVE TARGET

VARIABLE INPUT DEVICE UTILIZING TIME-OF-FLIGHT OF AN OPTICAL TRANSMISSION THROUGH A DISCONTINUOUS OPTICAL GUIDE

TECHNOLOGICAL FIELD

Embodiments of the present disclosure relate generally to variable input devices, and more particularly, to variable input devices providing a variable input within an operating range to an operating device.

BACKGROUND

Many electrical and/or mechanical operating devices utilize an input mechanism to provide a variable input within an operating range defined by the device. For example, a dimmable light may utilize a variable input device to control the voltage or pulse width provided to the dimmable light, and thus the intensity of the light emitted. Control of the operating range of a device, is usually accomplished by a control device reading an output of a sensor. Sensors may include a capacitive sensor, a mechanical switch/button (+/−), a rotating dial, an ultrasonic sensor, or other sensing device configured to provide a variable output.

Applicant has identified many technical challenges and difficulties associated with providing a variable input to an operating device. Through applied effort, ingenuity, and innovation, Applicant has solved problems related to the determination of a variable input by developing solutions embodied in the present disclosure, which are described in detail below.

BRIEF SUMMARY

Various embodiments are directed to a variable input device, a dimmable light system, and a computer-implemented method for determining a variable input for an operating device configured to receive the variable input within an operating range. An example variable input device may include an optical guide, an illumination source, an optical receiver, and a controller. The optical guide includes a first end, an interface surface, and a plurality of reflective structures positioned within the optical guide. Each reflective structure of the plurality of reflective structures is a unique distance from the first end. The illumination source is optically coupled to the first end of the optical guide and positioned to direct emitted light toward each reflective structure of the plurality of reflective structures, wherein each reflective structure of the plurality of reflective structures is configured to direct a reflected portion of the emitted light out of the interface surface of the optical guide. The optical receiver is optically coupled to the first end and positioned to receive a returned portion of the emitted light reflected by a reflective target proximate the interface surface of the optical guide. The controller is configured to determine a lateral position of the reflective target relative to the first end based on a time-of-flight of the returned portion of the emitted light, and generate a variable input for an operating device configured to receive the variable input within an operating range.

In some embodiments, the variable input comprises at least one of a frequency, a voltage, a current, an amplitude, and a phase offset within the operating range of the operating device.

In some embodiments, the controller is configured to cause a transmission of an electrical signal, wherein the electrical signal comprises the variable input.

In some embodiments, the operating device comprises a dimmable light source defining the operating range.

In some embodiments, the controller is configured to adjust an electrical signal transmitted to the operating device based on the lateral position of the reflective target relative to the first end of the optical guide.

In some embodiments, the plurality of reflective structures are equally spaced within the optical guide.

In some embodiments, the reflected portion of emitted light is directed out of the interface surface in a direction normal to the interface surface.

In some embodiments, the interface surface is flat.

In some embodiments, the interface surface is curved.

In some embodiments, a separation distance between the interface surface and the reflective target is determined based on the reflective target simultaneously reflecting the reflected portion from a second plurality of reflective structures of the plurality of reflective structures.

In some embodiments, an input gesture is recognized based on a change in the separation distance between the interface surface and the reflective target.

An example dimmable light system is further provided. In some embodiments, an example dimmable light system may comprise a dimmable light source wherein a brightness of the dimmable light source varies in accordance with a variable voltage of an electrical signal received at the dimmable light source. The dimmable light system may further comprise a variable input device. The variable input device comprising an optical guide, an illumination source, an optical receiver, and a controller. The optical guide includes a first end; an interface surface; and a plurality of reflective structures positioned within the optical guide, wherein each reflective structure of the plurality of reflective structures is a unique distance from the first end. The illumination source optically coupled to the first end of the optical guide and positioned to direct emitted light toward each reflective structure of the plurality of reflective structures, wherein each reflective structure of the plurality of reflective structures is configured to direct a reflected portion of the emitted light out of the interface surface of the optical guide. The optical receiver optically coupled to the first end and positioned to receive a returned portion of the emitted light reflected by a reflective target proximate the interface surface of the optical guide. The controller is configured to determine a lateral position of the reflective target relative to the first end based on a time-of-flight of the returned portion of the emitted light, and adjust the variable voltage of the electrical signal based on the lateral position of the reflective target.

In some embodiments, the variable voltage of the dimmable light source comprises an operating range the controller is configured to cause a transmission of the electrical signal having a transmission voltage within the operating range.

In some embodiments, the plurality of reflective structures are equally spaced within the optical guide.

In some embodiments, the plurality of reflective structures are colinear.

In some embodiments, the reflected portion of emitted light is directed out of the interface surface in a direction normal to the interface surface.

In some embodiments, the interface surface is flat.

In some embodiments, the interface surface is curved.

In some embodiments, a separation distance between the interface surface and the reflective target is determined based on the reflective target simultaneously reflecting the reflected portion from a second plurality of reflective structures of the plurality of reflective structures.

A computer-implemented method for determining a variable input for an operating device configured to receive the variable input within an operating range is further provided. In some embodiments, the computer-implemented method comprises initiating, by a controller, transmission of emitted light from an illumination source optically coupled to a first end of an optical guide and positioned to direct the emitted light toward a plurality of reflective structures within the optical guide, wherein each reflective structure of the plurality of reflective structures is a unique distance from the first end, and wherein each reflective structure of the plurality of reflective structures is positioned to direct a reflected portion of the emitted light out of an interface surface of the optical guide. The computer-implemented method further comprises determining a lateral position of a reflective target proximate the interface surface of the optical guide relative to the first end, based on a time-of-flight of a returned portion of the emitted light, wherein the returned portion of the emitted light is reflected by the reflective target. The computer-implemented method further comprises adjusting the variable input within the operating range of the operating device based on the lateral position of the reflective target.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 6 depicts a flow chart of an example process for determining a variable input for an operating device configured to receive the variable input within an operating range in accordance with an example embodiment of the present disclosure.

DETAILED DESCRIPTION

Figure 1:
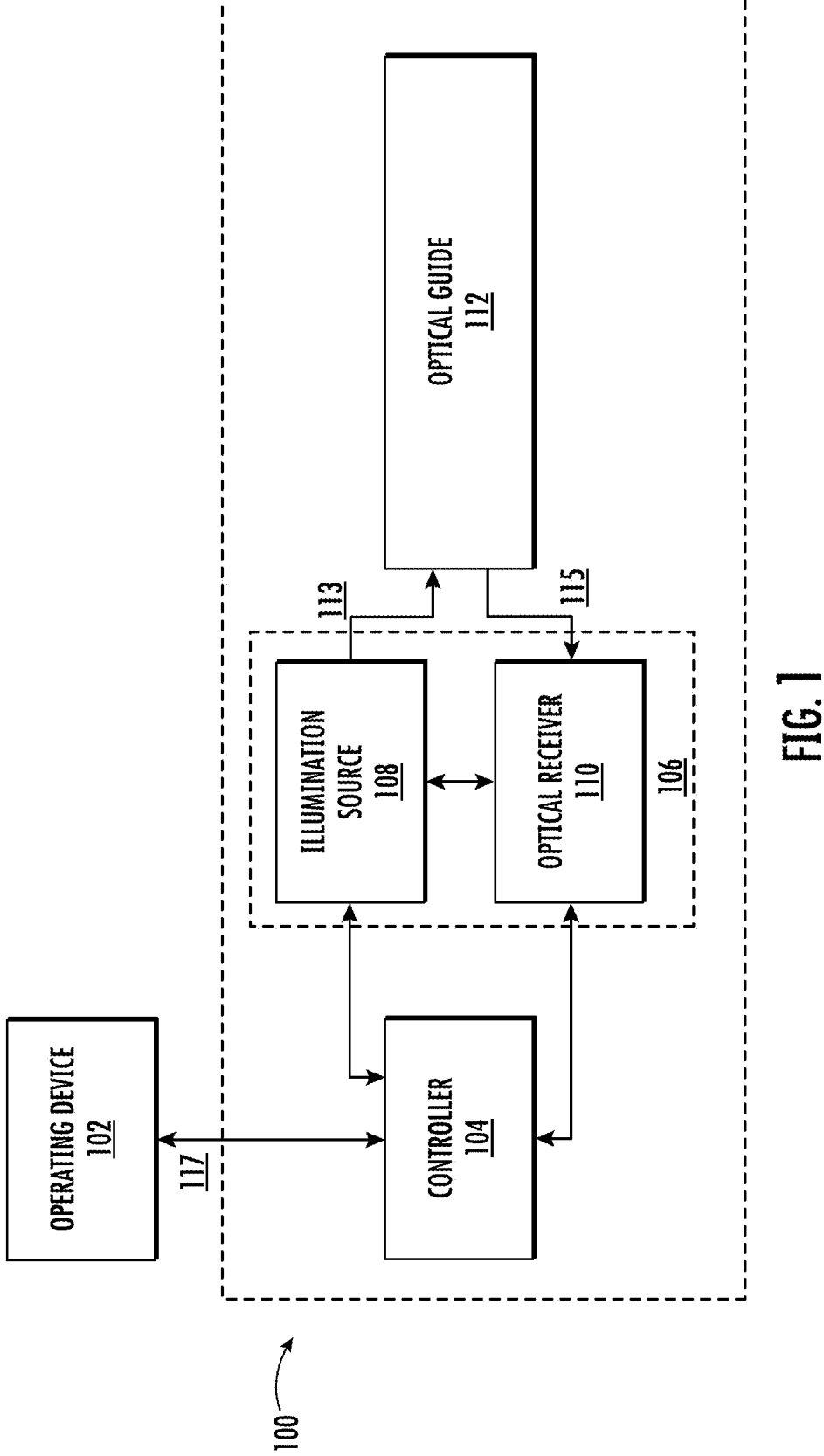
FIG. 1 illustrates a block diagram depicting an example variable input device provided a variable input to an operating device in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with providing a variable input to an operating device configured to receive the variable input within an operating range. As understood by those of skill in the field to which the present disclosure pertains, there are numerous example scenarios in which a device may include an interface in which a user may specify a variable input within an operating range.

For example, many electromechanical or electronic devices utilize a variable input device to provide a variable input value in order to specify a particular setting within an operating range of the electromechanical device. One specific example is a dimmable light source utilizing a variable input device to control the intensity of light output. Another example may be a smoke detector configured to detect targets proximate the device at defined ranges. Other example operating devices may include devices with variable motor settings, screen settings such as brightness, volume settings, or any other operating device that utilizes a variable input.

Variable control of the operating range of an electromechanical device, is usually accomplished by a control device reading at the output of a sensor, for example detecting a change in resistance of a potentiometer. Sensors for detecting a variable input may also include capacitive sensors, mechanical switches and/or buttons, rotating dials, ultrasonic sensors, or other sensing device configured to provide a range of variable inputs.

In general, manufacturers looking to provide a variable input device as an interface to a user, may consider the aesthetic properties of the variable input device. For example, a manufacturer may desire a flat, stylish design for a variable input device. In addition, a manufacturer may require ornamentation or additional texture on or around the variable input device. Certain variable input mechanisms, such as buttons, mechanical switches, rotating dials, ultrasonic sensors, and the like may be considered tacky, outmoded, or unfashionable. In addition, more aesthetically pleasing options, such as capacitive touch technology, may limit the style and design accompanying the variable input device. For example, a variable input device utilizing a capacitive touch sensor may limit the use of conductive materials in the variable input device design, such as a metal cover.

Further, variable input mechanisms utilizing capacitive touch may not recognize an input when a user is wearing gloves or otherwise utilizing an input mechanism that does not change the capacitive properties of the underlying capacitive sensor. In addition, many variable input devices may not be configured to recognize multiple input or when multiple objects are interacting with the variable input device. A capacitive sensor may also have limited accuracy in determining the exact input of a user. As such, there is a need for a highly accurate, variable input device that recognizes input from various objects, including multiple objects simultaneously. In addition, there is a need for a variable input device that may be utilized with various styles, ornamentation, and decoration.

The various example embodiments described herein describe a variable input device utilizing a discontinuous optical guide to determine a variable input based on the position of a reflective target relative to the optical guide.

For example, in some embodiments, an optical guide is provided with a plurality of reflective structures (e.g., discontinuities), each reflective structure positioned at a unique distance from a first end of the optical guide. In addition, a time-of-flight sensor comprising an illumination source is positioned near the first end of the optical guide and configured to generate emitted light into the optical guide, to pass through each reflective structure. The reflective structures direct the emitted light out of the optical guide at an interface surface. In an instance in which a reflective target, such as the finger of a person, is proximate the interface surface of the optical guide, the reflected light is returned to the optical guide and directed back toward an optical receiver at the time-of-flight sensor. By determining the time-of-flight of the emitted light, a controller may be configured to determine an actual or relative lateral position of the reflective target relative to the first end of the optical guide. Repositioning the reflective target relative to the first end of the optical guide results in variable lateral positions. Such variable lateral positions may be used to determine a variable input within an operating range of a corresponding operating device.

As a result of the herein described example embodiments and in some examples, the accuracy and effectiveness of a variable input device may be greatly improved. The various example embodiments described herein further describe a variable input device configured to receive input from multiple target types, including simultaneously. In addition, the variable input device of the present disclosure may be configured with various styles and ornamentation to provide a sleek and stylish user interface.

Referring now to FIG. 1, and example variable input device 100 configured to transmit a variable input 117 to an operating device 102 is provided. As depicted in FIG. 1, the variable input device 100 includes a time-of-flight sensor 106 comprising an illumination source 108 and an optical receiver 110. The illumination source 108 is positioned to transmit emitted light 113 into an optical guide 112. The optical receiver is positioned to receive a returned portion 115 of the emitted light 113 from the optical guide 112. As further depicted in FIG. 1, a controller 104 is electrically coupled to the time-of-flight sensor 106. The controller 104 is configured to transmit a variable input 117 to the operating device 102 based on the time-of-flight determinations of the time-of-flight sensor 106.

As depicted in FIG. 1, the example variable input device 100 includes an optical guide 112. An optical guide 112 is any physical structure configured to guide the transmission of electromagnetic waves (e.g., emitted light 113) within the physical structure. An optical guide 112 may comprise plastic, glass, liquid, optical fiber, polycarbonate, and/or some combination thereof. The optical guide 112 may be configured to guide electromagnetic waves of a particular wavelength. For example, in some embodiments, the optical guide 112 may be designed to guide near infrared electromagnetic waves (e.g., 800 nanometers to 2500 nanometers). The optical guide 112 includes a first end, or source end, configured to receive the emitted light 113 from the time-of-flight sensor 106. The optical guide 112 may be any shape that enables the transmission of electromagnetic waves within the optical guide 112 structure. For example, the optical guide 112 may be linear, circular, or another shape.

Figure 3:
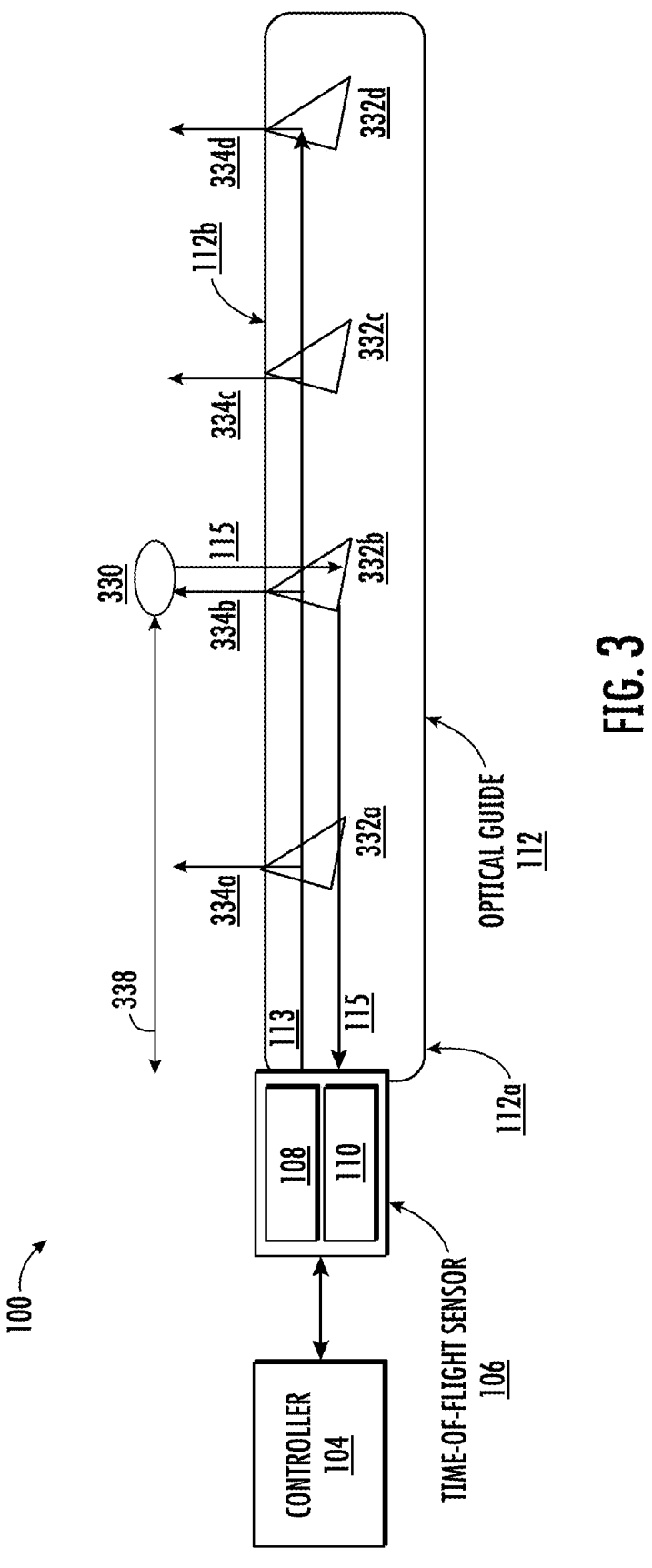
FIG. 3 illustrates an example optical guide comprising a plurality of reflective structures in accordance with an example embodiment of the present disclosure.

As further described in relation to FIG. 3, the optical guide 112 includes an interface surface and a plurality of reflective structures configured to direct a reflected portion of the emitted light 113 toward the interface surface. In an instance in which a reflective target is proximate the interface surface of the optical guide 112, light may be returned into the optical guide 112 and reflected back toward the time-of-flight sensor 106 as a returned portion 115 of emitted light 113.

As further depicted in FIG. 1, the example variable input device 100 includes a time-of-flight sensor 106 comprising an illumination source 108 and an optical receiver 110. An illumination source 108 is any single light source or array of light sources configured to generate emitted light 113 to at least partially transmit through the optical guide 112. The illumination source 108 may be any semiconductor, diode, or other photon emitting structure configured to generate optical output, such as laser light. The illumination source 108 may be configured to generate emitted light 113 at a specific wavelength or spectrum of wavelengths. For example, the illumination source 108 may be configured to generate near infrared emitted light 113 having a wavelength between 800 nanometers and 2500 nanometers. In some embodiments, the illumination source 108 may be a laser diode.

The illumination source 108 is further configured to transmit a reference signal to the optical receiver 110. The reference signal is a portion of the emitted light 113. A reference signal may be created by transmitting the emitted light 113 through an optical beam splitter. The reference signal may be utilized to compare the emitted light with the returned portion 115 of the emitted light 113. Comparing the arrival time of the returned portion 115 of the emitted light 113 with the reference signal provided by the illumination source 108 may enable the time-of-flight sensor 106 to determine the time-of-flight of the returned portion 115 of the emitted light 113. The time-of-flight of the returned portion 115 of the emitted light 113 may indicate a lateral position of a reflective target, relative to the optical guide 112.

An optical receiver 110 is any device, sensor, photodiode, or other structure that produces an electric current corresponding to the light received (e.g., returned portion 115 of the emitted light 113) at the optical receiver 110. An optical receiver 110 may comprise an array of pixels, each configured to convert photons into an electric current. The optical receiver 110 may be configured to capture a returned portion 115 of the emitted light 113 by converting the intensity of light received into an electric current.

The time-of-flight sensor 106 may be configured to transmit pulsed emitted light 113 periodically and determine time-of-flight measurements by comparing the returned portion 115 of the emitted light 113 with the reference signal corresponding to the emitted light 113. Comparing the returned portion 115 of the emitted light 113 with the reference signal corresponding to the emitted light 113 may indicate the round-trip travel time of the emitted light 113. A distance may be determined based on the time-of-flight measurements.

In some embodiments, the time-of-flight measurements may be determined by the controller 104 based on the electrical signal corresponding to the received returned portion 115 of the emitted light 113.

As further depicted in FIG. 1, the example variable input device 100 includes a controller 104. A controller 104 comprises one or more computing devices electrically coupled to the time-of-flight sensor 106 and the operating device 102 and configured to receive time-of-flight data from the time-of-flight sensor 106 and determine a variable input 117 within the operating range of the operating device 102. A controller 104 may utilize any techniques to determine a variable input 117 within the operating range of the operating device 102 based on a determination of the lateral position of a reflective target relative to the optical guide 112 or based on the determination of the range between the reflective target and the optical receiver 110. For example, a controller 104 may scale the lateral position of the reflective target relative to the operating range of the operating device 102. The determination of the variable input 117 based on the lateral position of a reflective target is described further in FIG. 3. An example controller 104 architecture is described further in relation to FIG. 2.

Figure 4:
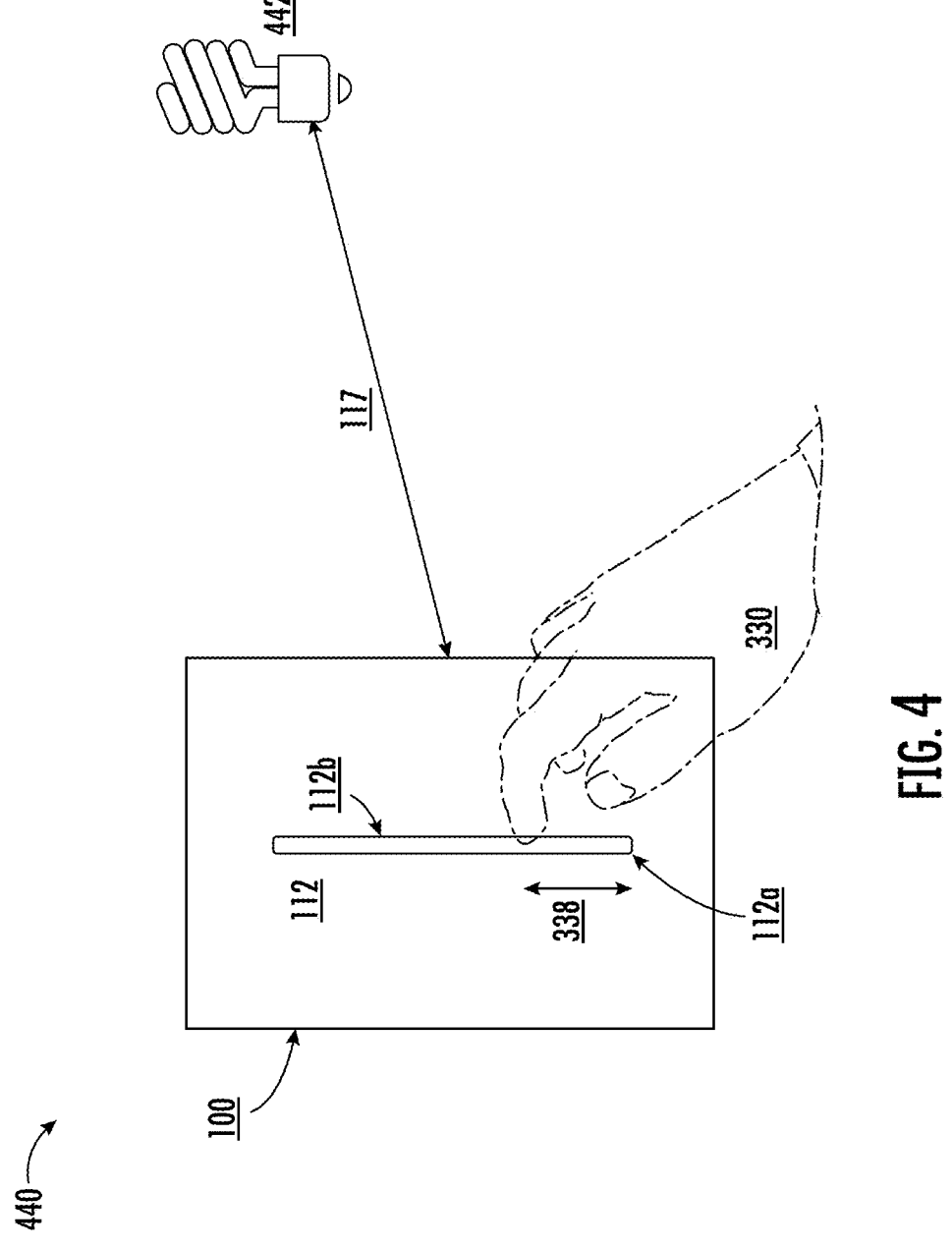
FIG. 4 illustrates an example dimmable light system comprising a variable input device and a dimmable light source in accordance with an example embodiment of the present disclosure.

As further depicted in FIG. 1, the variable input device 100 is communicatively connected to an operating device 102. An operating device is any electrical, mechanical, and/or electromechanical device configured to receive a variable input 117 and perform an action based on the value of the variable input 117. For example, an operating device 102 may comprise a dimmable light source (e.g., dimmable light source 442 as depicted in FIG. 4). In other examples, an operating device 102 may comprise one or more motors configured to adjust speed based on a variable input 117; an operating device 102 may comprise a display configured to adjust one or more display settings based on the variable input 117; an operating device 102 may comprise one or more speakers configured to adjust one or more audio settings based on the variable input 117; and so on. In some embodiments, the operating device 102 may define an operating range for one or more characteristics configured to be adjusted based on the variable input 117. For example, a dimmable light bulb may define an operating range between 2 volts and 120 volts. The variable input 117 may be adjusted by the controller 104 within the operating range defined by the operating device 102 based on the lateral position of a reflective target relative to the optical guide 112.

As further depicted in FIG. 1, the operating device 102 is configured to receive a variable input 117. The variable input 117 comprises any electrical signal, data, value, or other electrical input received by the operating device 102. The variable input 117 may be an alternating current or direct current electrical signal. In some embodiments, the variable input 117 is an electrical signal with a variable electrical property wherein the variable electrical property is adjusted based on the lateral position of the reflective target relative to the optical guide 112. For example, a variable electrical property may include a frequency, a voltage, a current, an amplitude, a phase offset, a pulse width, and so on. Thus, the controller 104 may cause a variable electrical property of the variable input 117 to be adjusted based on the lateral position of the reflective target relative to the optical guide 112 or the range of the reflective target to the optical guide 112. Such adjustment may include causing the transmission of the variable input 117 to change from 2 volts to 6 volts; causing the frequency to change from 60 hertz to 120 hertz; causing the pulse width to change from 2 microseconds to 4 microseconds; and so on. In some embodiments, the variable input 117 may be represented by a digital value. For example, a digital value based on the lateral position of the reflective target relative to the optical guide 112 may be determined by the controller 104 and transmitted to the operating device 102.

Figure 2:
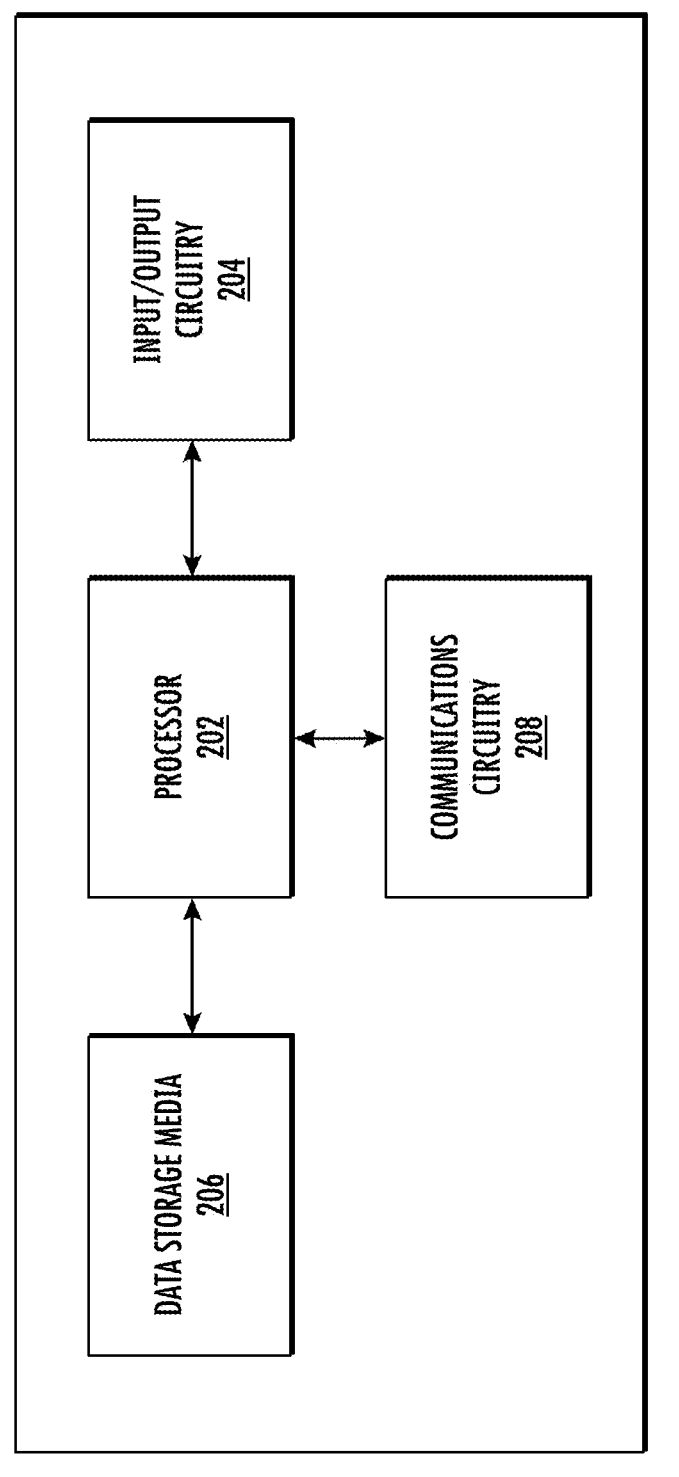
FIG. 2 illustrates a block diagram depicting example components of a controller in accordance with an example embodiment of the present disclosure.

Referring now to FIG. 2, FIG. 2 illustrates an example controller 104 in accordance with at least some example embodiments of the present disclosure. The controller 104 includes processor 202, input/output circuitry 204, data storage media 206, and communications circuitry 208. In some embodiments, the controller 104 is configured, using one or more of the sets of circuitry 202, 204, 206, and/or 208, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the controller 104 provide or supplement the functionality of other particular sets of circuitry. For example, the processor 202 in some embodiments provides processing functionality to any of the sets of circuitry, the data storage media 206 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the data storage media 206 via a bus for passing information among components of the controller 104. In some embodiments, for example, the data storage media 206 is non-transitory and may include, for example, one or more volatile and/or non-volatile memories. In other words, for example, the data storage media 206 in some embodiments includes or embodies an electronic storage device (e.g., a computer readable storage medium). In some embodiments, the data storage media 206 is configured to store information, data, content, applications, instructions, or the like, for enabling the controller 104 to carry out various functions in accordance with example embodiments of the present disclosure.

The processor 202 may be embodied in a number of different ways. For example, in some example embodiments, the processor 202 includes one or more processing devices configured to perform independently. Additionally, or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the controller 104, and/or one or more remote or "cloud" processor(s) external to the controller 104.

In an example embodiment, the processor 202 is configured to execute instructions stored in the data storage media 206 or otherwise accessible to the processor. Alternatively, or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively, or additionally, as another example in some example embodiments, when the processor 202 is embodied as an executor of software instructions, the instructions specifically configure the processor 202 to perform the algorithms embodied in the specific operations described herein when such instructions are executed.

In some embodiments, the controller 104 includes input/output circuitry 204 that provides output to the user and, in some embodiments, to receive an indication of a user input. In some embodiments, the input/output circuitry 204 is in communication with the processor 202 to provide such functionality. The input/output circuitry 204 may comprise one or more user interface(s) (e.g., user interface) and in some embodiments includes a display that comprises the interface(s) rendered as a web user interface, an application user interface, a user device, a backend system, or the like. The processor 202 and/or input/output circuitry 204 comprising the processor may be configured to control one or more functions of one or more user interface elements through computer program instructions (e.g., software and/or firmware) stored on a memory accessible to the processor (e.g., data storage media 206, and/or the like). In some embodiments, the input/output circuitry 204 includes or utilizes a user-facing application to provide input/output functionality to a client device and/or other display associated with a user.

In some embodiments, the controller 104 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the controller 104. In this regard, the communications circuitry 208 includes, for example in some embodiments, a network interface for enabling communications with a wired or wireless communications network. Additionally, or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the controller 104.

Additionally, or alternatively, in some embodiments, one or more of the sets of circuitry 202-208 are combinable. Additionally, or alternatively, in some embodiments, one or more of the sets of circuitry perform some or all of the functionality described associated with another component. For example, in some embodiments, one or more sets of circuitry 202-208 are combined into a single module embodied in hardware, software, firmware, and/or a combination thereof.

Referring now to FIG. 3, an example variable input device 100 electrically coupled to a controller 104 is depicted. As depicted in FIG. 3, the example variable input device 100 includes a time-of-flight sensor 106 coupled to a first end 112a of an optical guide 112. The time-of-flight sensor 106 includes an illumination source 108 and an optical receiver 110, configured to perform time-of-flight measurements of the emitted light 113. As further depicted in FIG. 3, the optical guide 112 includes a plurality of reflective structures 332a-332d. Each reflective structure 332a-332d is configured to reflect a reflected portion 334a-334d of the emitted light 113 out of the interface surface 112b of the optical guide 112. In an instance in which a reflective target 330 is proximate the interface surface 112b of the optical guide 112, a returned portion 115 of the emitted light 113 is reflected off the reflective target 330 back into the optical guide 112. The returned portion 115 of the emitted light is directed back toward the first end 112a of the optical guide 112 by the plurality of reflective structures 332a-332d, to be received by the optical receiver 110 of the time-of-flight sensor 106.

As depicted in FIG. 3, the example variable input device 100 includes an optical guide 112 having a first end 112a and an interface surface. An optical guide 112 may comprise any shape configured to enable internal reflection of the emitted light 113 and escape of the reflected portion 334a-334d at each of the plurality of reflective structures 332a-332d. Although depicted with four reflective structures 332a-332d, the optical guide 112 may comprise any number of reflective structures. An optical guide 112 includes a first end 112a. The first end 112a is proximate the time-of-flight sensor 106 and provides an interface for receiving the emitted light 113 from the illumination source 108 into the optical guide 112.

The optical guide 112 further comprises an interface surface 112b. An interface surface 112b is any surface of the optical guide 112 through which the reflected portion 334a-334d of the emitted light 113 is transmitted. The interface surface 112b provides a surface with which a reflective target 330 may interact with the reflected portion 334a-334d of the emitted light 113. For example, a reflective target 330 may be placed on or near the interface surface 112b such that a lateral position 338 relative to the first end 112a of the optical guide may be determined. The variable input provided to the operating device may be determined based on the lateral position 338 of the reflective target 330 on or near the interface surface 112b. In some embodiments, the interface surface 112b may be a flat surface. In some embodiments, the interface surface 112b may comprise a curved or rounded surface. An interface surface 112b may be marked indicating to a user the approximate variable input or relative variable input associated with each lateral position 338. For example, an interface surface 112b may include markings such as 10%, 20%, 30%, and so on, on or near the interface surface 112b, indicating to a user the approximate variable input associated with various lateral positions 338.

As further depicted in FIG. 3, the example variable input device 100 includes a plurality of reflective structures 332a-332d. A reflective structure 332a-332d comprises any enclosure, occlusion, junction, beam splitter, or other optical device configured to reflect a reflected portion 334a-334d of the emitted light 113 toward the interface surface 112b and transmit a portion of the emitted light 113 through the reflective structure 332a-332d. A reflective structure 332a-332d may comprise plastic, glass, liquid, optical fiber, polycarbonate, and/or some combination thereof.

In addition, a reflective structure 332a-332d is configured to direct light reflecting off the reflective target 330 toward the time-of-flight sensor 106 proximate the first end 112a of the optical guide 112. Directing the returned portion 115 of the emitted light 113 toward the time-of-flight sensor 106 enables the time-of-flight sensor 106 to determine time-of-flight data associated with the returned portion 115 of the emitted light 113.

As further depicted in FIG. 3, the reflective structures 332*a*-332*d* are each positioned at a unique distance from the first end 112*a* of the optical guide 112. Positioning each reflective structure 332*a*-332*d* at a unique distance results in a unique time-of-flight measurement for the returned portion 115 of the emitted light 113 based on the lateral position 338 of the reflective target 330. Thus, positioning each reflective structure 332*a*-332*d* at a unique distance enables a controller 104 to determine the lateral position 338 of the reflective target 330 based on the unique time-of-flight measurement of the emitted light 113. In some embodiments, the controller 104 may also determine the range of the reflective target 330 to the optical guide 112.

In some embodiments, the reflective structures 332*a*-332*d* may be equally spaced. For example, in an instance in which there are 8 reflective structures 332, a first reflective structure may be placed at ⅛$^{th}$ the length of the optical guide 112, a second reflective structure at ⅖$^{th}$ the length of the optical guide 112, a third reflective structure at ⅜$^{th}$ the length of the optical guide 112, and so on. Providing adequate space between each of the reflective structures 332*a*-332*d* may ensure adequate separation of the time-of-flight measurements between successive reflective structures 332*a*-332*d*.

As further depicted in FIG. 3, the reflective structures 332*a*-332*d* are positioned to reflect a reflected portion 334*a*-334*d* of the emitted light 113 out of the optical guide 112 at the interface surface 112*b*. The reflected portion 334*a*-334*d* may be any portion of emitted light 113 directed by a reflective structure 332*a*-332*b* toward the interface surface 112*b*. The reflective structures 332*a*-332*b* are configured such that the reflected portion 334*a*-334*d* encounters the interface surface 112*b* at an incident angle enabling the exit of the reflected portion 334*a*-334*d* from the optical guide 112. In some embodiments, the reflected portion 334*a*-334*d* of emitted light 113 may exit the optical guide 112 at an angle normal or nearly normal to the interface surface 112*b*. Although not depicted, in some embodiments, the interface surface 112*b* may include optical features, including divots, grooves, notches, indentations, walls, or other features enabling the exit of the emitted light 113 from the optical guide 112 to interact with a reflective target 330.

As further depicted in FIG. 3, a reflective target 330 positioned near the interface surface 112*b* of the optical guide 112 reflects the reflected portion 334*b* of emitted light 113 back toward the optical guide 112 and reflective structure 332*b* as a returned portion 115 of the emitted light 113. A reflective target 330 may be any object of which at least a portion of the object reflects the emitted light 113. For example, a reflective target 330 may be the finger of a person, a hand, a pointer, or other reflective object. In some embodiments, a reflective target 330 and/or the emitted light 113 may be selected based on the ability of the reflective target 330 to reflect the particular wavelength of the emitted light 113. For example, the wavelength of the emitted light 113 may be selected so that the reflected portion 334*b* reflects off the reflective target 330, for example, in an instance in which the intended target is a finger of a user. Similarly, a material may be selected as the reflective target 330 based on the ability of the material to reflect the wavelength of light comprising the reflected portion 334*b* of emitted light 113.

As further depicted in FIG. 3, the lateral position 338 of the reflective target 330 may be determined based on the time-of-flight of the returned portion 115 of the emitted light

113. As depicted in FIG. 3, the lateral position 338 of the reflective target 330 is a position of the reflective target 330 with respect to the first end 112*a* of the optical guide 112. The lateral position 338 may be a one-dimensional position at the interface surface 112*b* along a path parallel to the traversal path of the emitted light 113. In some embodiments, the lateral position 338 may be a distance of the reflective target 330 from the first end 112*a* of the optical guide 112 (e.g., a distance in millimeters, centimeters, etc.). In some embodiments, the lateral position 338 may represent a scaled position relative to the length of the optical guide 112 (e.g., 10%, 20%, or 30% of the length of the optical guide 112). In some embodiments, the lateral position 338 may be a position relative to a previous lateral position 338 (e.g., further from or closer to the first end 112*a* then a previous lateral position 338). In some embodiments, the lateral position 338 may be represented as a time-of-flight, for example the time-of-flight of the returned portion 115 of the emitted light 113 (e.g., 120 picoseconds, 150 picoseconds, etc.). In each instance, the lateral position 338 may be determined based on the time-of-flight of the returned portion 115 of the emitted light 113.

The lateral position 338 of the reflective target 330 may be used to determine a variable input (e.g., variable input 117 as described in FIG. 1) of an operating device (e.g., operating device 102). During operation of the operating device, the controller 104 may receive and/or determine the operating range of the operating device. In addition, the controller 104 may receive and/or determine the lateral position 338 of the reflective target 330 based on the time-of-flight of the returned portion 115 of the emitted light 113. The lateral position 338 may be scaled based on the operating range of the operating device to determine a variable input. For example, in one embodiment, the optical guide 112 may have a length of 10 centimeters with a reflective structure 332 placed every 2 centimeters. In addition, the operating device may define a voltage range of a received variable input electrical signal between 2.0 volts and 6.0 volts. Based on the time-of-flight data and/or the positions of the reflective structures 332, the controller 104 may determine the lateral position 338 of a reflective target 330. In an instance in which the reflective target 330 is at a lateral position 338 of 4 centimeters from the first end 112*a* of the optical guide 112, the controller may scale the lateral position 338 of the reflective target 330 based on the known operating range of the operating device. For example, using an equation similar to Equation (1):

$$\text{INPUT}_{VAR} = \frac{D_{TAR}}{L_{OG}} \cdot (OR_{MAX} - OR_{MIN}) + OR_{MIN} \tag{1}$$

where $OR_{MIN}$ and $OR_{MAX}$ define the operating range of the operating device, $D_{TAR}$ is the lateral position 338 (e.g., distance from the first end 112*a*) of the reflective target 330, $L_{OG}$ is the length of the optical guide, and $\text{INPUT}_{VAR}$ is the variable input provided to the operating device. In the example above, the variable input may be determined using Equation (1) by:

$$\text{INPUT}_{VAR} = \frac{4 \text{ cm}}{10 \text{ cm}} \cdot (6.0 \text{ volts} - 2.0 \text{ volts}) + 2.0 \text{ volts} =$$

$$\frac{16}{10} \text{ volts} + 2.0 \text{ volts} = 3.6 \text{ volts}$$

Thus, the voltage of the variable input may be set to 3.6 volts based on the lateral position 338 of the reflective target 330. Although described in volts, the operating range and variable input may include any range of values, for example, a range of digital values.

In some embodiments, multiple reflective targets 330 may be positioned near the interface surface 112b of the optical guide 112. The controller 104 may determine the presence of multiple reflective targets 330 based on the receipt of multiple returned portions 115 of the emitted light 113 each having a unique time-of-flight. The controller 104 may determine the lateral position 338 of each of the multiple reflective targets 330 and adjust the variable input based on the multiple reflective targets 330.

Utilizing emitted light 113 and a reflective target 330 to determine the presence and/or lateral position 338 of the reflective target 330 in order to adjust a variable input to an operating device may enable user input to be determined using various mechanisms, including using a finger of a user, even in an instance in which the user is wearing gloves.

Referring now to FIG. 4, an example dimmable light system 440 is provided. The dimmable light system 440 of FIG. 4 represents an example embodiment of the variable input device 100 and operating device (e.g., operating device 102) as described herein. As depicted in FIG. 4, the example dimmable light system 440 includes a variable input device 100 comprising an optical guide 112 with an exposed interface surface 112b. The variable input device 100 is configured to generate a variable input 117 to a dimmable light source 442 based on the lateral position 338 of the reflective target 330 relative to the first end 112a of the optical guide 112.

As depicted in FIG. 4, the example dimmable light system 440 includes a dimmable light source 442. A dimmable light source 442 is any light source configured to adapt the brightness of the light generated by the dimmable light source 442 based on a variable input 117. A dimmable light source may utilize various mechanisms to adjust the brightness of the generated light. For example, the brightness of the generated light may be adjusted based on the pulse width of the received electrical signal. In addition, the brightness of the generated light may be adjusted based on the voltage or power of the received electrical signal. In some embodiments, the brightness of the generated light may be adjusted based on the current of the received electrical signal. Thus, the variable input 117 may be used to adjust the brightness of the dimmable light source 442, for example, by adjusting the voltage, pulse width, and/or current. As described herein, the value of the variable input 117 may be adjusted within a valid operating range defined by the dimmable light source 442.

As further depicted in FIG. 4, the variable input device 100 may adjust the variable input 117 based on the lateral position 338 of the reflective target 330 (e.g., the finger of a user). As depicted in FIG. 4, a surface (e.g., interface surface 112b) of the optical guide 112 is exposed to a user. As described herein, the reflective structures within the optical guide 112 reflect a reflected portion of emitted light out of the optical guide 112 through the interface surface 112b. In some embodiments, the emitted light may be outside the visible spectrum (e.g., infrared light/near infrared light) and not detectable to the user. By positioning a finger on or near the interface surface 112b, a user may control the variable input 117 generated by the variable input device 100. For example, the variable input device 100 may determine the lateral position 338 of the finger (e.g., reflective target 330) of the user and scale the variable input 117 within the operating range of the dimmable light source 442 based on the lateral position 338 of the finger. A user may reposition a finger on the interface surface 112b, changing the lateral position 338 determined by the variable input device 100 and adapting the variable input 117. For example, a user may slide the finger up and down the interface surface 112b continuously updating the variable input 117.

Figure 5:
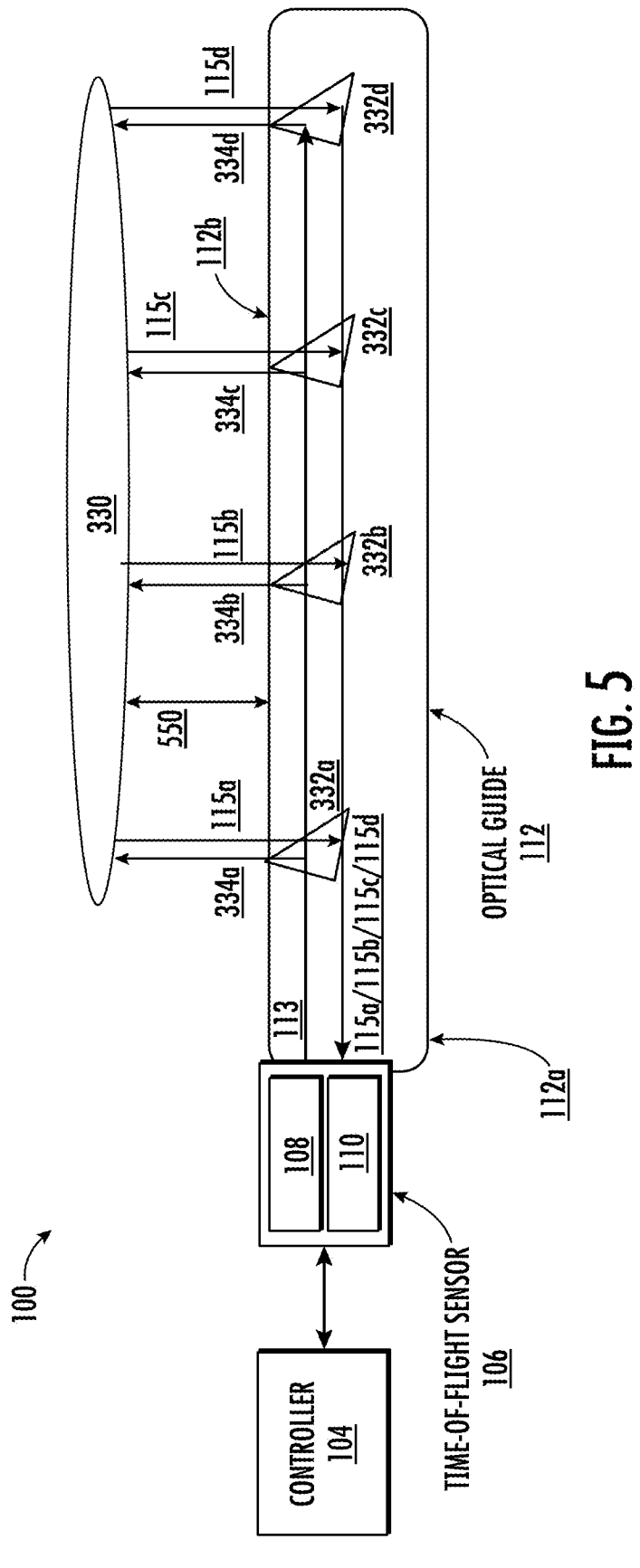
FIG. 5 illustrates an example variable input device configured to detect a separation distance of a reflective target from the optical guide in accordance with an example embodiment of the present disclosure.

Referring now to FIG. 5, an example variable input device 100 configured to determine a separation distance 550 of a large reflective target 330 is provided. As depicted in FIG. 5, the example variable input device 100 includes a time-of-flight sensor 106 coupled to a first end 112a of an optical guide 112. The time-of-flight sensor 106 includes an illumination source 108 and an optical receiver 110, configured to perform time-of-flight measurements of the emitted light 113. As further depicted in FIG. 5, the optical guide 112 includes a plurality of reflective structures 332a-332d. Each reflective structure 332a-332d is configured to reflect a reflected portion 334a-334d of the emitted light 113 out of the interface surface 112b of the optical guide 112. In an instance in which a reflective target 330 proximate the interface surface 112b reflects a plurality of returned portions 115a-115d of the emitted light 113, a controller 104 may be used to determine a separation distance 550 of the reflective target from the optical guide 112.

As depicted in FIG. 5, in an instance in which a larger reflective target 330 (e.g., the palm of a user) is positioned near the interface surface 112b of the optical guide 112, a plurality of reflected portions 334a-334d of the emitted light 113 are reflected as returned portions 115a-115d of the emitted light 113. Utilizing the time-of-flight measurements from each of the returned portions 115a-115d the controller 104 may determine a separation distance 550. The separation distance 550 is any measurement indicating the distance of the reflective target 330 from a reference point on the optical guide 112, for example, the interface surface 112b of the optical guide 112. In an instance in which the reflected portion 334a-334d of the emitted light 113 from a plurality of the reflective structures 332a-332d is returned as returned portions 115a-115d, a controller 104 may determine the reflective structure 332a-332d associated with each returned portion 115a-115d. Once the associated reflective structure 332a-332d is determined, the controller 104 may determine the portion of the time-of-flight measurement of each returned portion 115a-115d associated with the time-of-flight from the optical guide 112 to the reflective target 330. Thus, the portion of the time-of-flight measurement associated with the time-of-flight from the optical guide 112 to the reflective target 330 indicates the separation distance 550. In some embodiments, the separation distance 550 determined in relation to each returned portion 115a-115d may be used to fine-tune the determined separation distance 550. For example, the separation distance 550 may be correlated with the average separation distance 550 determined based on each returned portion 115a-115d.

The separation distance 550 of the reflective target 330 may be utilized to determine specific interactions with the variable input device 100. For example, in some embodiments, input gestures may be determined based on a change in the separation distance 550 over time. A user may repeatedly move the palm of their hand closer to and further away from the variable input device 100 as one particular input gesture. The input gesture may be detected by the controller 104 and used to adjust the variable input provided to an operating device. Other input gestures may include waving a hand, covering the variable input device 100, and so on. Each gesture may be associated with a specific action related to the variable input. In the example of FIG. 4, covering the variable input device 100 may cause the dimmable light source 442 to turn off. Similarly, moving a hand repeatedly toward and away from the variable input device 100 may set the dimmable light source 442 to full brightness. Waving a hand near the variable input device 100 may cause the dimmable light source 442 to blink, and so on.

Referring now to FIG. 6, and example process 600 for determining at a variable input device (e.g., variable input device 100) a variable input (e.g., variable input 117) for an operating device (e.g., operating device 102, dimmable light source 442) is provided. At block 602, the controller (e.g., controller 104) of the variable input device initiates transmission of emitted light from an illumination source (e.g., illumination source 108) optically coupled to a first end (e.g., first end 112*a*) of an optical guide (e.g., optical guide 112) and positioned to direct the emitted light (e.g., emitted light 113) toward a plurality of reflective structures (e.g., reflective structures 332) within the optical guide, wherein each reflective structure of the plurality of reflective structures is a unique distance from the first end, and wherein each reflective structure of the plurality of reflective structures is positioned to direct a reflected portion (e.g., reflected portion 334) of the emitted light out of the interface surface (e.g., interface surface 112*b*) of the optical guide. As described herein, a time-of-flight sensor (e.g., time-of-flight sensor 106) comprising an illumination source and an optical receiver is electrically coupled to the controller and optically coupled to the first end of the optical guide. The time-of-flight sensor may be configured to periodically transmit one or more optical signals comprising emitted light, into the first end of the optical guide.

At block 604, the controller determines a lateral position (e.g., lateral position 338) of a reflective target (e.g., reflective target 330) proximate the interface surface of the optical guide relative to the first end, based on a time-of-flight of a returned portion (e.g., returned portion 115) of the emitted light, wherein the returned portion of the emitted light is reflected by the reflective target. In some embodiments, the emitted light may be pulsed or patterned such that the time-of-flight of a returned portion of the emitted light may be compared to a reference signal and the time-of-flight of the returned portion of the emitted light determined. Utilizing the time-of-flight measurements, the lateral position of a reflective target (e.g., a finger of a user) may be determined. As described herein, a lateral position may be a linear distance measured at the interface surface 112*b* and relative to the first end of the optical guide along a path parallel to the traversal path of the emitted light. The lateral position may be represented as an actual distance, a relative distance (e.g., nearer, farther), a ratio or percentage relative to the optical guide, a position represented by the time-of-flight of the returned portion of emitted light, and so on.

At block 606, the controller adjusts the variable input within the operating range of the operating device based on the lateral position of the reflective target. The controller may be configured with, and/or configured to receive an operating range of the associated operating device. The controller may further be configured to adjust a variable input with respect to the lateral position of the reflective target. For example, the controller may scale the lateral position within the operating range of the operating device. Once the lateral position is scaled and a variable input value determined, the controller may adjust the variable input provided to the operating device. For example, the controller may adjust a variable electrical property such as the voltage, frequency, pulse width, power, or other parameter of an electrical signal. Adjusting the variable input may modify the behavior of the operating device in accordance with the lateral position of the reflective target relative to the optical guide. In some embodiments, the controller may inform another device of the range between the reflective target to optical receiver 112.

While this detailed description has set forth some embodiments of the present invention, the appended claims cover other embodiments of the present invention which differ from the described embodiments according to various modifications and improvements. For example, one skilled in the art may recognize that such principles may be applied to any electrical, mechanical, and/or electromechanical device configured to receive a variable electrical signal as input. For example, a dimmable light, a motor, a display screen, an audio system, a smoke detector and so on.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A variable input device comprising:
an optical guide, comprising:
  a first end;
  an interface surface; and
  a plurality of reflective structures positioned within the optical guide,
    wherein each reflective structure of the plurality of reflective structures is a unique distance from the first end;
an illumination source optically coupled to the first end of the optical guide and positioned to direct emitted light toward each reflective structure of the plurality of reflective structures,
  wherein each reflective structure of the plurality of reflective structures is configured to direct a reflected portion of the emitted light out of the interface surface of the optical guide;
an optical receiver optically coupled to the first end and positioned to receive a returned portion of the emitted light reflected by a reflective target proximate the interface surface of the optical guide; and
a controller configured to:
  determine a lateral position of the reflective target relative to the first end based on a time-of-flight of the returned portion of the emitted light; and
  generate a variable input for an operating device configured to receive the variable input within an operating range.

2. The variable input device of claim 1, wherein the variable input comprises at least one of a frequency, a voltage, a current, an amplitude, and a phase offset within the operating range of the operating device.

3. The variable input device of claim 2, wherein the controller is configured to cause a transmission of an electrical signal, wherein the electrical signal comprises the variable input.

4. The variable input device of claim 1, wherein the operating device comprises a dimmable light source defining the operating range.

5. The variable input device of claim 4, wherein the controller is configured to adjust an electrical signal transmitted to the operating device based on the lateral position of the reflective target relative to the first end of the optical guide.

6. The variable input device of claim 1, wherein the plurality of reflective structures are equally spaced within the optical guide.

7. The variable input device of claim 1, wherein the reflected portion of emitted light is directed out of the interface surface in a direction normal to the interface surface.

8. The variable input device of claim 1, wherein the interface surface is flat.

9. The variable input device of claim 1, wherein the interface surface is curved.

10. The variable input device of claim 1, wherein a separation distance between the interface surface and the reflective target is determined based on the reflective target simultaneously reflecting the reflected portion from a second plurality of reflective structures of the plurality of reflective structures.

11. The variable input device of claim 10, wherein an input gesture is recognized based on a change in the separation distance between the interface surface and the reflective target.

12. A dimmable light system comprising:
  a dimmable light source wherein a brightness of the dimmable light source varies in accordance with a variable voltage of an electrical signal received at the dimmable light source; and
  a variable input device comprising:
    an optical guide, comprising:
      a first end;
      an interface surface; and
      a plurality of reflective structures positioned within the optical guide,
        wherein each reflective structure of the plurality of reflective structures is a unique distance from the first end;
    an illumination source optically coupled to the first end of the optical guide and positioned to direct emitted light toward each reflective structure of the plurality of reflective structures,
      wherein each reflective structure of the plurality of reflective structures is configured to direct a reflected portion of the emitted light out of the interface surface of the optical guide;
    an optical receiver optically coupled to the first end and positioned to receive a returned portion of the emitted light reflected by a reflective target proximate the interface surface of the optical guide; and
  a controller configured to:
    determine a lateral position of the reflective target relative to the first end based on a time-of-flight of the returned portion of the emitted light; and
    adjust the variable voltage of the electrical signal based on the lateral position of the reflective target.

13. The dimmable light system of claim 12, wherein the variable voltage of the dimmable light source comprises an operating range the controller is configured to cause a transmission of the electrical signal having a transmission voltage within the operating range.

14. The dimmable light system of claim 12, wherein the plurality of reflective structures are equally spaced within the optical guide.

15. The dimmable light system of claim 12, wherein the plurality of reflective structures are colinear.

16. The dimmable light system of claim 12, wherein the reflected portion of emitted light is directed out of the interface surface in a direction normal to the interface surface.

17. The dimmable light system of claim 12, wherein the interface surface is flat.

18. The dimmable light system of claim 12, wherein the interface surface is curved.

19. The dimmable light system of claim 12, wherein a separation distance between the interface surface and the reflective target is determined based on the reflective target simultaneously reflecting the reflected portion from a second plurality of reflective structures of the plurality of reflective structures.

20. A computer-implemented method for determining a variable input for an operating device configured to receive the variable input within an operating range:
  initiating, by a controller, transmission of emitted light from an illumination source optically coupled to a first end of an optical guide and positioned to direct the emitted light toward a plurality of reflective structures within the optical guide,
    wherein each reflective structure of the plurality of reflective structures is a unique distance from the first end, and
    wherein each reflective structure of the plurality of reflective structures is positioned to direct a reflected portion of the emitted light out of an interface surface of the optical guide;
  determining a lateral position of a reflective target proximate the interface surface of the optical guide relative to the first end, based on a time-of-flight of a returned portion of the emitted light,
    wherein the returned portion of the emitted light is reflected by the reflective target; and
  adjusting the variable input within the operating range of the operating device based on the lateral position of the reflective target.

* * * * *